United States Patent [19]
Fung et al.

[11] Patent Number: 5,867,725
[45] Date of Patent: Feb. 2, 1999

[54] CONCURRENT MULTITASKING IN A UNIPROCESSOR

[75] Inventors: Patrick Wai-Wah Fung, Burlington; Sebastian Theodore Ventrone, Jericho, both of Vt.

[73] Assignee: International Business Machines Corporation, Armonk, N.Y.

[21] Appl. No.: 618,689

[22] Filed: Mar. 21, 1996

[51] Int. Cl.[6] ................................................. G06F 9/38
[52] U.S. Cl. ........................ 395/800.23; 395/800.42; 395/376
[58] Field of Search ................ 398/800.23, 800.41; 395/392, 393, 394, 391, 376, 800.42

[56] References Cited

U.S. PATENT DOCUMENTS

| | | | |
|---|---|---|---|
| 4,480,308 | 10/1984 | Grafe et al. | 395/671 |
| 4,604,694 | 8/1986 | Hough | 395/726 |
| 4,658,351 | 4/1987 | Teng | 395/673 |
| 4,965,718 | 10/1990 | George et al. | 395/674 |
| 4,980,824 | 12/1990 | Tulpule et al. | 395/676 |
| 5,056,015 | 10/1991 | Baldwin et al. | 35/500 |
| 5,201,049 | 4/1993 | Shorter | 395/406 A |
| 5,293,602 | 3/1994 | Fukagawa et al. | 395/474 |
| 5,303,369 | 4/1994 | Borcherding et al. | 395/674 |
| 5,421,022 | 5/1995 | McKean et al. | 395/800.23 |
| 5,428,754 | 6/1995 | Baldwin | 395/561 |
| 5,434,985 | 7/1995 | Emma et al. | 395/375 |
| 5,438,680 | 8/1995 | Sullivan | 395/670 |
| 5,546,593 | 8/1996 | Kimura et al. | 395/800.23 |
| 5,625,789 | 4/1997 | Hesson et al. | 395/393 |
| 5,664,120 | 9/1997 | Afsar et al. | 395/393 |

OTHER PUBLICATIONS

Serrano "Performance Estimation in a simultaneous Multi-threading Processor," Feb. 1996.

Agarwai "Performance Tradeoffs in Multithreaded Processors, 1992".

MacIntyre et al. "The effect of Cache on The Performance of a Multi-Threaded Pipeline RISC", 1991.

Gulati et al. "Performance Study of a MultiThreaded Superscalar", Feb. 1997.

*Primary Examiner*—Larry D. Donaghue
*Attorney, Agent, or Firm*—Eugene I. Shkurko; Brian F. Russell; Andrew J. Dillon

[57] ABSTRACT

A superscalar uniprocessor that performs concurrent multi-task processing is provided. The processor of the present invention maintains a complete set of program address, memory control and general data registers for each task executing concurrently within the microprocessor, allowing independent control of the program flows. Each set of registers are associated with only one task and are utilized by the memory control and execution units to execute the associated task. The processor includes an instruction fetcher and memory management unit that retrieves an instruction from memory for a given task, as directed by the task's address and control registers, and attaches a task tag to the retrieved instruction that identifies that task. The superscalar processor has a plurality of execution units that can execute a plurality of tasks simultaneously, and a dispatch unit that sends a retrieved instruction and its attached task tag to one of the plurality of execution units for execution. The instruction's task tag identifying the task is then associated with any result data that results from the execution of the instruction. The addition of task tag information in the program flow and in the register file provides for process utilization of execution resources simultaneously with, and substantially independently from other processes, thereby substantially enhancing concurrent multitasking in the superscalar uniprocessor.

24 Claims, 2 Drawing Sheets

CONCURRENT MULTITASKING IN A UNIPROCESSOR

BACKGROUND OF THE INVENTION

1. Technical Field

The present invention relates in general to an improved uniprocessor, and in particular to an improved uniprocessor having multitasking. Still more particularly, the present invention relates to a uniprocessor providing concurrent multi-task processing.

2. Description of the Related Art

Multitasking within a computer is a mode of operation offered by an operating system in which a computer works on more than one task at a time. Each task has an associated process so that several processes are being executed by the single processor, or uniprocessor, but only one process controls the processor at any given time. Multitasking is accomplished by sharing clock cycles among the processes in a time-slice manner, wherein each task is given a fraction of the microprocessor's clock cycles to execute its process. To maintain order, tasks are either processed in order of priority or are processed in sequential order.

Multitasking within a uniprocessor can be very inefficient. As the processor is multitasking between multiple tasks, the current state of the processor for each task must be both loaded and stored as the task is switched in and out. This switching of the control of the processor consumes valuable processor cycles. Another inefficiency occurs in a superscalar uniprocessor architecture having multiple execution units for executing a single task in parallel (as much as possible) when, depending upon the current task program flow, large blocks of processor resources are under-utilized or not utilized at all during a particular task. Still another inefficiency in a uniprocessor occurs when a branch is mispredicted and the processor's resources remain idle while the program stream of the task is reset and the new instruction stream for the correct branch is started. In each of these situations, the uniprocessor wastes valuable resources and clock cycles that could be used to execute another task. Clearly, it would be desirable to provide a uniprocessor that will perform concurrent multitasking without the described inefficiencies in processor resource utilization.

SUMMARY OF THE INVENTION

According to the present invention, a processor that performs concurrent multi-task processing is provided. The processor includes a plurality of execution units that can execute a plurality of tasks simultaneously; an instruction fetcher that retrieves an instruction from memory for a given task and attaches a task tag to the retrieved instruction, wherein the attached task tag identifies the task that requested the retrieved instruction; two or more of sets of registers, each set of registers having an associated task and being utilized by the instruction fetcher and the execution units for executing the associated task, wherein each set of registers maintains a task tag identifying its associated task; and a dispatch unit that sends a retrieved instruction and its attached task tag to one of the plurality of execution units for execution. In response to a request by a task, a requested instruction is fetched by the instruction fetcher and a task tag is attached to the retrieved instruction. When the instruction is executing in an execution unit, the execution unit utilizes the set of registers maintaining a task tag equivalent to the task tag attached to the executing instruction. The instruction's task tag is then associated with result data that results from the execution of the instruction. The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
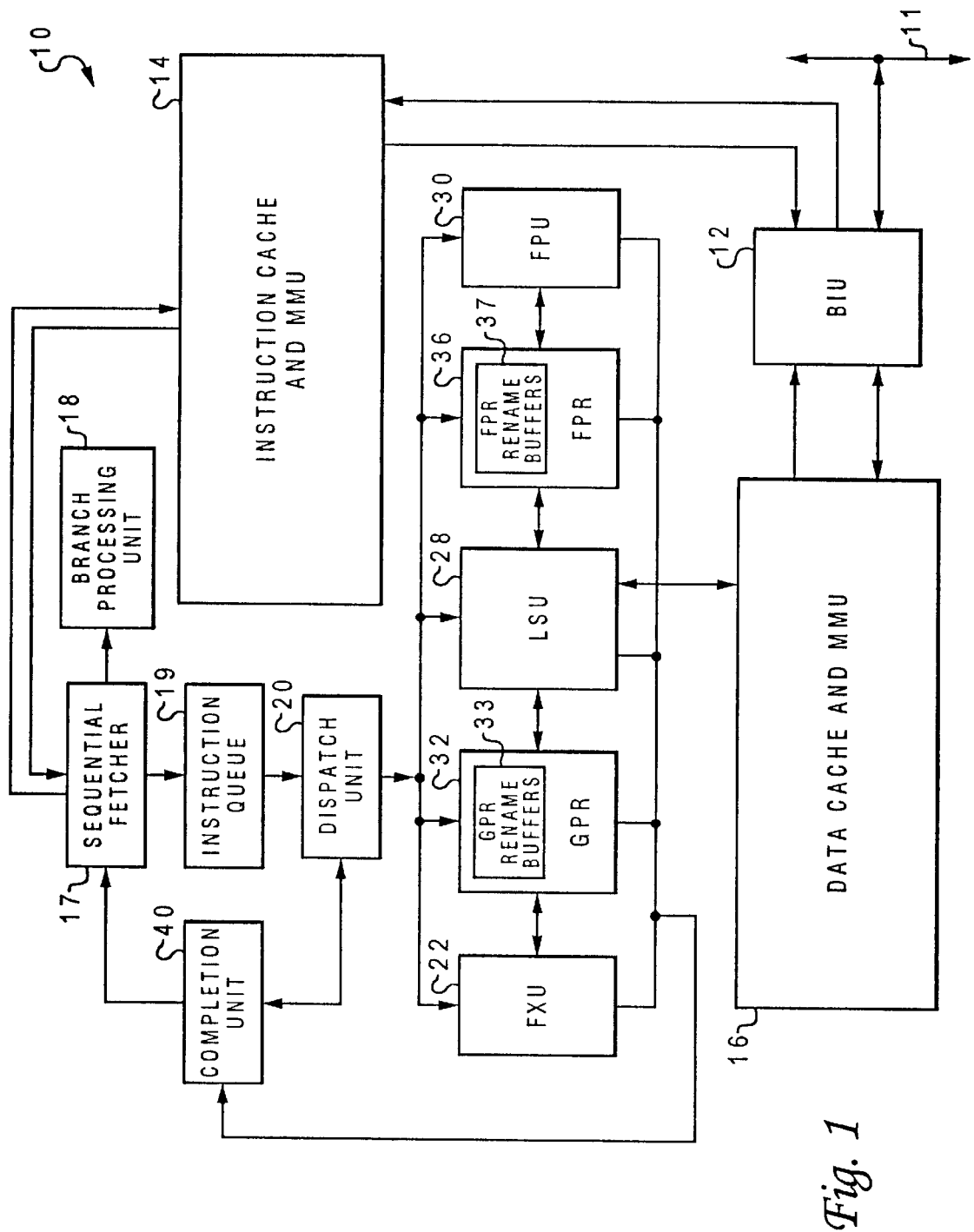
FIG. 1 illustrates a block diagram of a processor for processing information according to a preferred embodiment of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor capable of executing multiple instructions per processor cycle. Accordingly, as discussed further below, processor 10 includes various execution units, registers, buffers, memories, and other functional units, which are all formed by integrated circuitry.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units, the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order. Completion unit 40 tracks instructions from dispatch through execution, and then retires, or "completes" them in program order. Completing an instruction commits the process to any architectural register changes caused by that instruction. In-order completion ensures the correct architectural state when the microprocessor must recover from a mispredicted branch or any exception.

In the depicted embodiment, in addition to BPU 18, the execution circuitry of processor 10 comprises multiple execution units, including fixed-point unit (FXU) 22, load/store unit (LSU) 28, and floating-point unit (FPU) 30. These execution units can execute instructions simultaneously during a single processor cycle. Each of execution units 18, 22, 28, and 30 can execute one or more instructions within a particular class of instructions. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

Figure 2:
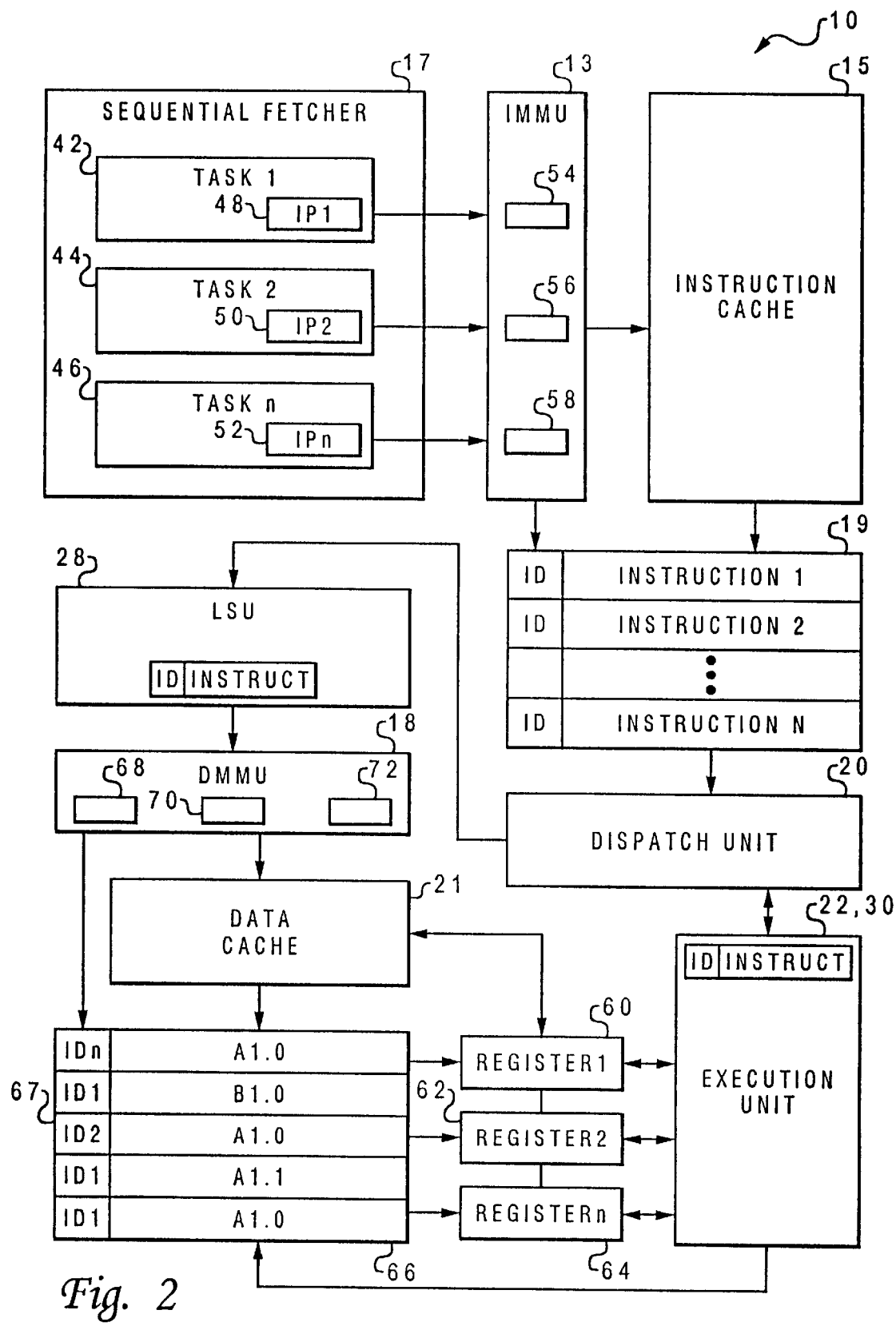
FIG. 2 shows a dataflow diagram for the processor of FIG. 1, in accordance with a preferred embodiment of the present invention.

Referring now to FIG. 2, there is shown a dataflow diagram for the processor of FIG. 1, in accordance with a preferred embodiment of the present invention. Microprocessor 10 provides concurrent multitasking of multiple processes 42–46, designated as Task 1, Task 2, and Task n, respectively. While the present description is for a system executing three tasks concurrently, it will be appreciated that the present description is equally applicable to a system executing any number (n) of tasks concurrently. Each task 42–46 has an associated instruction pointer (IP) contained in a program counter register 48–52, respectively, within sequential fetcher 17. When a given task's instruction pointer increments, sequential fetcher 17 sends an instruction request to the Instruction Memory Management Unit (IMMU) 13 requesting the next instruction of that process. Thus, the separate program counter registers enable sequential fetcher 17 to independently control the fetching of the program streams for the multiple tasks.

IMMU 13 supports demand-paged virtual memory and is managed by the operating system, which programs the IMMU registers, including segment registers, BAT registers, and page table registers. The IMMU utilizes these memory control registers to perform address translation of instruction requests. As seen in FIG. 2, IMMU 13 maintains a complete set of memory control registers for each executing task in the processor, so that each set of memory control registers 54, 56 and 58 are dedicated to Task 1, Task 2, and Task n, respectively. As each instruction request is returned to sequential fetcher 17, a task ID identifying the task that fetched the instruction is attached to the instruction. The task ID and instruction is then loaded from sequential fetcher 17 into instruction queue 19 together. (Alternatively, as indicated in FIG. 2, the associated task tag may be loaded from the IMMU and the instruction loaded directly from the instruction cache.) As will be appreciated, the separate program address registers and separate memory control registers maintained for each task allow each task to be independently loaded into instruction queue 19.

Dispatch unit 20 dispatches an instruction from instruction queue 19 to an appropriate execution unit 22, 30 or 28. As shown in FIG. 2, the dispatched instruction and its attached task tag is held by the execution unit 22, 28, 30 during its execution. Each set of registers 60–64 are a set of architected registers dedicated to a particular task (registers 60–64 comprise GPR 32 and FPR 36). As shown in FIG. 2, registers 60 (REGISTER1) have been assigned to Task 1, registers 62 (REGISTER2) have been assigned to Task 2, and registers 64 (REGISTERn) have been assigned to Task n. As an instruction is executing in execution units 22, 30, 28 any operand data required for execution is retrieved from the appropriate set of general purpose and floating point registers 60–64. The task tag associated with the instruction executing in execution units 22, 30, 28 will match a task tag associated with one of the sets of registers.

Result data from execution of an instruction in execution units 22, 30 are loaded into register file 66 (register file 66 comprises GPR rename buffers 33 and FPR rename buffers 37). The task tag identifying the task producing the result is also loaded into the register file and is maintained in association with the result. As an example, five results are stored in register file 66. The top rename register shows a first result for a register A having a task tag indicating Task n (IDn). The next result shows a first result for register B that is for Task 1 (ID1). The next rename buffer holds a result for register A that belongs to Task 2, as indicated by the attached task tag ID2. The next rename buffer entry is a second value in the program flow for register A that belongs to Task 1 (ID1), and the last rename register shows the first result for register A for Task 1. The program flow for Task 1 has been executed out of order and so the value A1.0 will be dedicated to register A of registers 60 prior to the rename buffer holding A1.1. Thereafter, when completion unit 40 completes the instruction and dedicates the results of the instruction to the architected registers, the result is loaded into the appropriate set of registers 60–64 being associated with the task identified by the register file task tag. As will be appreciated, the registers 60–64 each provide a unique set of registers for each task executing in the system. Thus, each task will have its own Register A, Register B, etc. that cannot be effected by another task.

If, instead of dispatching an instruction to execution unit 22, 30, a load or store instruction is dispatched to LSU 28, both the instruction and the attached task tag is dispatched by dispatch unit 20 and held by LSU 28, as shown in FIG. 2. LSU 28 passes the load or store request to Data Memory Management Unit (DMMU) 18, which is a demand-paged virtual memory device. DMMU 18 translates the effective address of the load or store into a physical address within data cache 21. In order to provide this address translation, a separate set of memory control registers, such as segment registers, BAT registers and page table registers, are maintained for each task executing within the processor. As shown in FIG. 2, a separate set of memory control registers 68, 70, and 72 are dedicated to Task 1, Task 2, and Task n, respectively.

If the instruction executing in LSU 28 is a store, the instruction's task tag is matched with the appropriate memory control registers to address the appropriate data within registers 60–64. If the instruction is a load, the addressed data is loaded into register file 66 from data cache 21 along with the task tag from DMMU 18. Thereafter, the loaded data is dedicated to the set of architected registers 60–64 associated with the task identified by the attached task tag in register file 66. While register file 66 may maintain a task tag for each register within the register file itself, it will be appreciated that rather than loading the task ID in the register file, the task tags may be maintained in a separate look-up table 67 corresponding to the rename buffers.

Whenever a branch is mispredicted within a task program, the program stream is reset and a new instruction stream restarted. In the prior art, all execution units would remain idle while the instruction stream is loaded and restarted. In the present invention, branch processing unit 18 will delete or "flush" only those instructions in the execution units having the task ID of the mispredicted task. All other tasks executing in the same execution unit or other execution units are allowed to continue execution.

Similarly, exception handling by the operating system would be performed by locking only those resources associated with a task causing an exception, and saving only the current state of registers having a task tag equivalent to the task tag of the task causing the exception. Upon resumption of the task, only those registers having that task ID would be restarted. Interrupts would be handled by requiring a halt of all ongoing tasks, and a switch-over to the function causing the interrupt.

As will now be appreciated, the microprocessor of the present invention maintains a complete set of program and memory control registers for each task executing concurrently within the microprocessor, allowing independent control of the program flows. The addition of task tag information in the program flow and in the register file for multitasking support provides enhanced utilization of execution resources and program coherency, thereby substantially enhancing concurrent multitasking in a superscalar uniprocessor. As will be appreciated, different execution units of a superscalar processor may be executing instructions from different tasks because of the independent control of the multiple tasks. Tasks will execute simultaneously and substantially independently from other processes, allowing true concurrent multitasking within the microprocessor. Unlike the prior art, which provides time-slice multitasking where a single task controls all execution units during a particular time-slice, the present invention provides a plurality of tasks simultaneous access to the multiple execution units during any given time-slice. Thus, enhanced performance is provided by the present invention when the execution units and processing resources of the microprocessor, which would conventionally be under-utilized or not utilized at all during a particular task, are more fully utilized by the simultaneous execution of tasks. Also, because switching between multiple tasks is not required in the present invention, the inefficiencies created by loading and storing the current state of the processor as each task is switched in and out is eliminated.

While the invention has been particularly shown and described with reference to a preferred embodiment, it will be understood by those skilled in the art that various changes in form and detail may be made therein without departing from the spirit and scope of the invention. For instance, although additional performance advantages are derived from using a superscalar processor, it will be understood that other types of processors may be utilized to practice the present invention. Also, as will be appreciated by those skilled in the art, the present invention can be practiced in one or more processors of a multiprocessor system to further enhance the performance of the multiprocessor system.

What is claimed is:

1. A concurrent-multitasking processor comprising:
    a plurality of execution units that can execute a plurality of tasks simultaneously;
    an instruction fetcher that retrieves an instruction from memory for a given task and attaches a task tag to the retrieved instruction, wherein the attached task tag identifies the task that requested the retrieved instruction;
    two or more of sets of registers, each set of registers having a respective associated task and being utilized by the instruction fetcher and the plurality of execution units for executing only the associated task, wherein each set of registers maintains a task tag identifying its associated task; and a dispatch unit that sends a retrieved instruction and its attached task tag to one of the plurality of execution units for execution;

wherein, when an instruction is executing in an execution unit, the execution unit utilizes only registers within the set of registers maintaining a task tag equivalent to the task tag attached to the executing instruction.

2. A concurrent-multitasking processor according to claim 1, wherein at least one set of registers includes a program address register.

3. A concurrent-multitasking processor according to claim 1, wherein at least one set of registers includes a memory control register.

4. A concurrent-multitasking processor according to claim 1, wherein at least one set of registers includes at least one general purpose or floating point register.

5. A concurrent-multitasking processor according to claim 1, wherein the task tags are maintained in their associated registers.

6. A concurrent-multitasking processor according to claim 1, wherein the task tags are maintained in a look-up table.

7. A concurrent-multitasking processor according to claim 1, said plurality of execution units comprising a load/store unit that loads from and stores to only the set of registers maintaining a task tag equivalent to the task tag attached to an instruction executing in the load/store unit.

8. A concurrent-multitasking processor according to claim 1, further comprising an exception handling mechanism that, in response to a task causing an exception in the processor, halts the execution of only instructions having an attached task tag that identifies the task causing the exception, and saves as the current state only data contained in the set of registers maintaining a task tag that identifies the task causing the exception.

9. A concurrent-multitasking processor according to claim 1, further comprising a branch processing unit that, in response to a task taking a mispredicted branch, flushes only instructions having an attached task tag identifying the task taking the mispredicted branch, allowing one of said plurality of execution units freed by flushing said instructions to be assigned to other tasks.

10. A concurrent-multitasking processor according to claim 1, wherein the result of an instruction executing in one of said plurality of execution units is saved in a register belonging to the set of registers maintaining a task tag equivalent to the task tag attached to the executing instruction.

11. A method of concurrent multitasking in a processor, the method comprising the steps of:

in response to a request by a task executing in the processor, receiving one or more requested instructions;

associating a task tag with a received instruction that indicates the task that requested the instruction; and associating the task tag associated with a received instruction with result data that results from execution of the received instruction.

12. A method of concurrent multitasking in a processor according to claim 11, further comprising:

when executing a received instruction that requires operand data, utilizing, as the operand data, result data having an associated task tag that is equivalent to the task tag associated with the executing instruction.

13. A method of concurrent multitasking in a processor according to claim 12, wherein only result data having an associated task tag that is equivalent to the task tag associated with the executing instruction may be utilized as the operand data.

14. A method of concurrent multitasking in a processor according to claim 11, wherein the received instruction is a load instruction and the result data is stored in a register within the set of registers having an associated task tag that is equivalent to the task tag associated with the load instruction.

15. A method of concurrent multitasking in a processor according to claim 11, further comprising, in response to the execution of a store instruction, storing only data having an associated task tag that is equivalent to the task tag associated with the store instruction.

16. A method of concurrent multitasking in a processor according to claim 11, further comprising, in response to a task causing an exception in the processor, halting only instructions having an associated task tag indicating the task causing the exception, and saving as the current state only data having an associated task tag indicating the task causing the exception.

17. A method of concurrent multitasking in a processor according to claim 11, further comprising, in response to a task taking a mispredicted branch, flushing only instructions having an associated task tag indicating the task taking the mispredicted branch, such that an execution unit freed by flushing said instructions can be assigned to other tasks.

18. A system providing concurrent multitasking in a processor, comprising:

means for in response to a request by a task executing in the processor, receiving one or more requested instructions;

means for associating a task tag with a received instruction that indicates the task that requested the instruction; and means for associating the task tag associated with a received instruction with result data that results from execution of the received instruction.

19. A system providing concurrent multitasking in a processor according to claim 18, further comprising means for, when executing a received instruction that requires operand data, utilizing, as the operand data, result data having an associated task tag that is equivalent to the task tag associated with the executing instruction.

20. A system providing concurrent multitasking in a processor according to claim 19, wherein only result data having an associated task tag that is equivalent to the task tag associated with the executing instruction may be utilized as the operand data.

21. A system providing concurrent multitasking in a processor according to claim 18, wherein the received instruction is a load instruction and the result data is stored in a register within the set of registers having an associated task tag that is equivalent to the task tag associated with the load instruction.

22. A system providing concurrent multitasking in a processor according to claim 18, further comprising means, in response responsive to the execution of a store instruction, for storing only data having an associated task tag that is equivalent to the task tag associated with the store instruction.

23. A system providing concurrent multitasking in a processor according to claim 18, further comprising means, responsive to a task causing an exception in the processor, for halting only instructions having an associated task tag indicating the task causing the exception, and saving as the current state only data having an associated task tag indicating the task causing the exception.

24. A system providing concurrent multitasking in a processor according to claim 18, further comprising means in response responsive to a task taking a mispredicted branch, for flushing only instructions having an associated task tag indicating the task taking the mispredicted branch, such that an execution unit freed by flushing said instructions can be assigned to other tasks.

\* \* \* \* \*

UNITED STATES PATENT AND TRADEMARK OFFICE
CERTIFICATE OF CORRECTION

PATENT NO. : 5,867,725
DATED : February 2, 1999
INVENTOR(S) : Fung et al.

It is certified that error appears in the above-identified patent and that said Letters Patent is hereby corrected as shown below:

IN THE CLAIMS:

Column 8, line 60, please delete "in response".

Column 9, line 6, please delete "in response".

Signed and Sealed this

Thirteenth Day of July, 1999

Attest:

Q. TODD DICKINSON

Attesting Officer

Acting Commissioner of Patents and Trademarks